United States Patent
Palmieri et al.

(10) Patent No.: US 9,651,278 B2
(45) Date of Patent: May 16, 2017

(54) METHOD FOR MANUFACTURING A VACUUM SOLAR THERMAL PANEL AND RELATED VACUUM SOLAR THERMAL PANEL

(75) Inventors: Vittorio Palmieri, Geneva (CH); Francesco Di Giamberardino, Colleferro (IT)

(73) Assignee: TVP SOLAR SA, Geneva (CH)

( * ) Notice: Subject to any disclaimer, the term of this patent is extended or adjusted under 35 U.S.C. 154(b) by 410 days.

(21) Appl. No.: 14/131,100

(22) PCT Filed: Jul. 4, 2012

(86) PCT No.: PCT/EP2012/002813
§ 371 (c)(1),
(2), (4) Date: Feb. 14, 2014

(87) PCT Pub. No.: WO2013/004378
PCT Pub. Date: Jan. 10, 2013

(65) Prior Publication Data
US 2014/0158112 A1   Jun. 12, 2014

(30) Foreign Application Priority Data
Jul. 7, 2011 (EP) .................................... 11005534

(51) Int. Cl.
*F24J 2/05*   (2006.01)
*B29C 33/30*   (2006.01)
*F24J 2/46*   (2006.01)

(52) U.S. Cl.
CPC ............... *F24J 2/05* (2013.01); *B29C 33/307* (2013.01); *F24J 2002/4681* (2013.01); *Y02E 10/44* (2013.01)

(58) Field of Classification Search
CPC ... F24J 2/05; F24J 2/055; Y02E 10/44; B29C 33/307
See application file for complete search history.

(56) References Cited

U.S. PATENT DOCUMENTS 4,493,940 A * 1/1985 Takaoka ................... F24J 2/268
126/570
4,703,749 A * 11/1987 Morse ..................... F22B 1/028
126/400
(Continued)

FOREIGN PATENT DOCUMENTS

| CH | WO 2010023074 A1 * | 3/2010 | ................. F24J 2/05 |
| JP | 2000055481 | 2/2000 | |

(Continued)

OTHER PUBLICATIONS

International Search Report mailed on Nov. 29, 2012 in International Application No. PCT/EP2012/002813. (4 pages).

*Primary Examiner* — Jacob Cigna

(57) ABSTRACT

A method for manufacturing a vacuum-tight envelope for a vacuum solar thermal panel includes: joining edge to edge a first metal strip to a second metal strip in order to form a bi-metal strip, and then joining together the opposite ends of said bi-metal strip in order to form a closed loop; after said joining step, forming said first metal strip into a peripheral frame and said second metal strip into a peripheral belt; after said joining and forming steps, sealing the free edge of the peripheral belt to a glass front plate; after said joining and forming steps, joining a metal bottom plate to the peripheral frame.

11 Claims, 4 Drawing Sheets

(56) References Cited

U.S. PATENT DOCUMENTS

| | | | |
|---|---|---|---|
| 4,803,972 A * | 2/1989 | Janson | F24J 2/4643 |
| | | | 126/710 |
| 8,578,930 B2 * | 11/2013 | Palmieri | F24J 2/05 |
| | | | 126/652 |
| 2007/0039611 A1 | 2/2007 | Benvenuti | |
| 2010/0006090 A1 * | 1/2010 | Palmieri | C03C 27/02 |
| | | | 126/704 |
| 2010/0126499 A1 * | 5/2010 | Lu | F24J 2/055 |
| | | | 126/651 |
| 2011/0146666 A1 | 6/2011 | Palmieri | |
| 2013/0000633 A1 * | 1/2013 | Morber | F24J 2/055 |
| | | | 126/652 |

FOREIGN PATENT DOCUMENTS

| | | |
|---|---|---|
| JP | 2000335623 | 12/2000 |
| WO | 2010003653 | 1/2010 |

\* cited by examiner

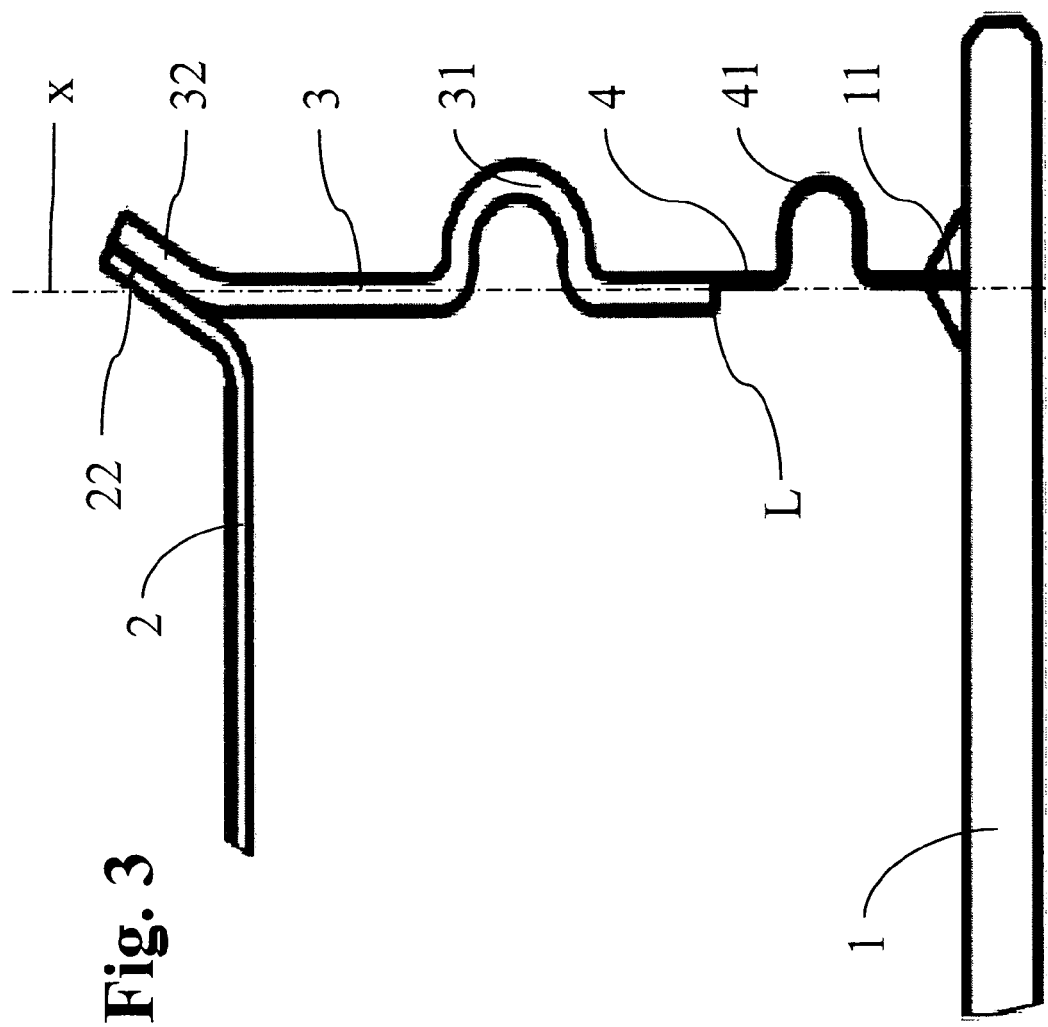

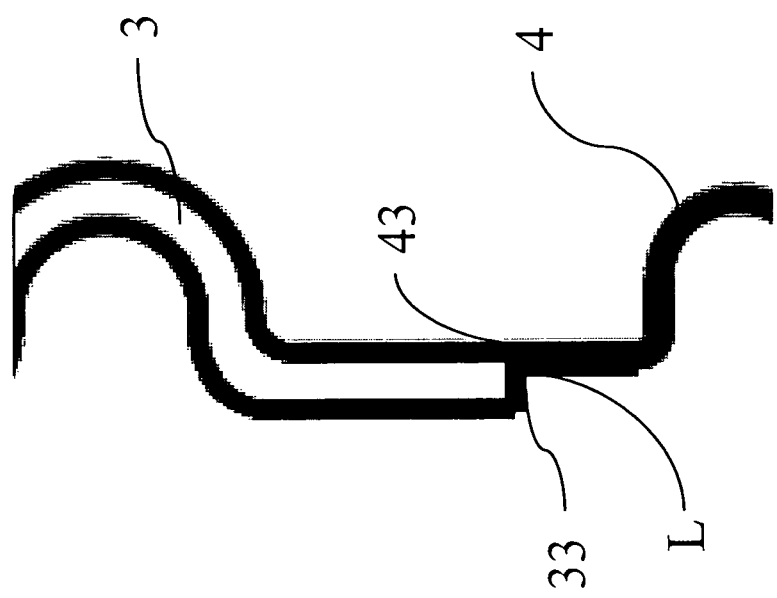

METHOD FOR MANUFACTURING A VACUUM SOLAR THERMAL PANEL AND RELATED VACUUM SOLAR THERMAL PANEL

CROSS-REFERENCE TO RELATED APPLICATIONS

This application is a §371 national stage entry of International Application No. PCT/EP2012/002813, filed Jul. 4, 2012, which claims priority to EP Application No. 11005534.0, filed Jul. 7, 2011, which are hereby incorporated herein by reference in their entireties.

DESCRIPTION

Field of Application

The present invention relates to an improved method for manufacturing a vacuum solar thermal panel and to a vacuum solar thermal panel suitable to be manufactured with such a method.

Prior Art

As it is well known, vacuum solar thermal panels comprise a vacuum-tight envelope wherein at least a front plate, usually made of glass, is transparent to solar radiation. The panel comprises heat absorbers disposed within the vacuum envelope and a pipe conveying a heat transfer fluid.

The solar radiation enters the vacuum envelope through the glass front plate, is collected by the heat absorbers and converted into heat. The heat is then transferred to the heat transfer fluid flowing into the pipe.

The vacuum-tight envelope may be a container wherein the bottom plate is integrally formed with the peripheral frame, as disclosed in U.S. Pat. No. 4,493,940, or else obtained by welding the two components, as described for instance in the PCT application published under No. WO 2010/003653 in the name of the same Applicant.

In the latter case, an elastic peripheral belt is advantageously interposed between the peripheral frame and the glass front plate. Such a peripheral belt is welded on one side to the metal frame, while the other side is attached to the glass front plate by means of a vacuum-tight glass-metal sealing of known type. The peripheral belt, made out of a metal alloy with a thermal expansion coefficient closely matching that of the glass front plate, limits the mechanical stress induced in the glass-metal seal.

Therefore, in manufacturing the vacuum solar panel, the peripheral belt is sealed to the glass front plate and then the welding between the metal peripheral belt itself and the metal peripheral frame is performed. However, this last manufacturing step has to be carried out with extreme care in order to avoid any damage to the glass-metal seal previously realised. Indeed, both thermal and mechanical stresses, potentially detrimental to the tightness of the seal, may derive from the welding step. The thermal stresses are due to heating of the peripheral belt, while the mechanical stresses depend from pressing the peripheral frame against the peripheral belt, which is necessary in order to achieve good mechanical contact between the parts thus ensuring uniformity and vacuum tightness of the welding seam.

In order to prevent at least the above-mentioned mechanical stresses, a very good dimensional match is needed between the peripheral frame and the peripheral belt: in such a way, a welding seam without discontinuities is achieved without the need of applying high pressure in order to keep the two parts in contact while welding. Such very good dimensional match requires however high-precision machining or moulding of the two parts. Moreover, deformation of the peripheral belt during the thermal process by which the glass-metal seal is obtained shall be limited to the minimum extent by means of a high precision firing jig together with an extremely accurate temperature control of such thermal process.

Increasing the manufacturing accuracy of the two parts to be welded together and employing a high precision firing jig together with an extremely accurate temperature control process greatly increases the cost as well as the complexity of the vacuum thermal panel production.

The technical problem underlying the present invention is therefore that of providing an alternative manufacturing method for a vacuum solar thermal panel, which prevents damaging of the glass-metal seal without resorting to expensive high accuracy manufacturing techniques.

SUMMARY OF THE INVENTION

A solution to the above-mentioned technical problem is provided by a method for manufacturing a vacuum-tight envelope for a vacuum solar thermal panel, said vacuum-tight envelope being defined by a glass front plate transparent to solar radiation, a metal bottom plate, a peripheral frame joined to the metal bottom plate, and a peripheral belt connecting said peripheral frame to the glass front plate; said method comprising the following steps:

joining edge to edge a first metal strip to a second metal strip in order to form a bi-metal strip, and then joining together the opposite ends of said bi-metal strip in order to form a closed loop;

after said joining step, forming said first metal strip into the peripheral frame and said second metal strip into the peripheral belt;

after said joining and forming steps, sealing the free edge of the peripheral belt to the glass front plate;

after said joining and forming steps, joining the metal bottom plate to the peripheral frame.

The metal-metal joining steps identified in the method above may be welding, brazing or soldering steps.

A skilled person will immediately recognise that the above-identified method greatly reduces the thermal and mechanical stresses acting on the glass-metal seal.

Indeed, the peripheral frame and the peripheral belt are joined before the realisation of the seal, and thus said joining step may not influence the seal in any way.

Advantageously, during the forming step the resulting free edge of the peripheral frame may be inclined with respect to a peripheral plane, on which the peripheral belt and frame lie, in order to define a joining edge and a step of forming the metal bottom plate in order to determine a joining edge inclined to match the inclination of the joining edge of the peripheral frame may be provided. In such a case, the joining edge of the metal bottom plate is joined to the joining edge of the peripheral frame during the final joining step, and such a step may be performed after the sealing step.

Indeed, thanks to the inclination of the joining edge of the peripheral frame and of the metal bottom plate, the frame itself and the metal bottom plate may be pressed one against the other during the last joining step (which may be performed for instance by welding) while keeping the peripheral belt orthogonal to the glass front plate. This prevents tangential stresses to be applied to the glass-metal seal, which are less likely absorbed by the ribbing in the same peripheral belt.

In order to achieve the above-mentioned advantage, the joining edge is preferably inclined outwards with respect to the resulting vacuum-tight envelope.

In particular, it is preferably inclined at an angle comprised between 5 degrees and 45 degrees, preferably 30 degrees, with respect to the peripheral plane.

As acknowledged in the prior art description, the peripheral frame may be rigid while the peripheral belt may be deformable.

The first metal strip preferably has a thermal expansion coefficient matching that of the glass front plate; this could be achieved my realising the first metal strip out of a controlled expansion alloy, for instance NiFe 48.

Given the different properties demanded to the two strips, the first metal strip is preferably thicker than the second metal strip.

Advantageously the sides of the first and second metal strips corresponding to the outer side of the resulting vacuum-tight envelope may be aligned during the step of joining edge to edge the first and second metal strips, in order to manufacture a vacuum-panel with a smooth outer surface.

The above mentioned forming step may comprise a step of shaping a first longitudinal rib in the peripheral frame, in order to increase the mechanical stiffness of the element.

The forming step may also comprise a step of shaping a second longitudinal rib in the peripheral belt, said second longitudinal rib determining an elastic portion of the peripheral belt.

Advantageously, before joining the metal bottom plate to the peripheral frame, the perimeter of said metal bottom plate may be formed in order to determine the joining edge inclined to match the inclination of the joining edge of the peripheral frame. The term matching the inclination of the joining edge means that the angle formed by the plane identified by the peripheral frame and the one identified by the bottom plate is approximately 90 degrees.

Advantageously, the sealing step may be performed by a thermal process determining fusion and subsequent solidification of glass material forming a vacuum-tight seal.

A solution to the above-mentioned technical problem is also provided by a vacuum solar thermal panel comprising a vacuum-tight envelope being defined by a glass front plate transparent to solar radiation, a metal bottom plate, a peripheral frame joined to the metal bottom plate, and a peripheral belt connecting said peripheral frame to the glass front plate the peripheral frame comprising a joining edge inclined with respect to a peripheral plane on which the peripheral belt and frame lie, the metal bottom plate comprising a joining edge inclined with respect to the metal bottom plate plane by an angle matching the angle of the joining edge of the peripheral frame, said joining edges of the metal bottom plate and of the peripheral frame being joined together.

Said joining edge of the peripheral frame is preferably inclined outwards with respect to the vacuum-tight envelope, at an angle which may be comprised between 5 degrees and 45 degrees, preferably 30 degrees with respect to the peripheral plane. While the joining edge of the metal bottom plate is inclined by an angle matching the angle of the joining edge of the peripheral frame The peripheral frame may advantageously feature a first longitudinal rib, while the peripheral belt may advantageously feature a second longitudinal rib.

Further characteristics and advantages shall be clearer from the detailed description, outlined hereinafter, of a preferred but not exclusive embodiment of the present finding, with reference to the attached figures provided for exemplifying and non-limiting purposes.

BRIEF DESCRIPTION OF THE DRAWINGS

In the drawings:

FIG. 3 schematically shows a cross-section of the detail in FIG. 2;

FIG. 4 shows an enlarged detail of the cross-section in FIG. 3.

DETAILED DESCRIPTION

Figure 1:
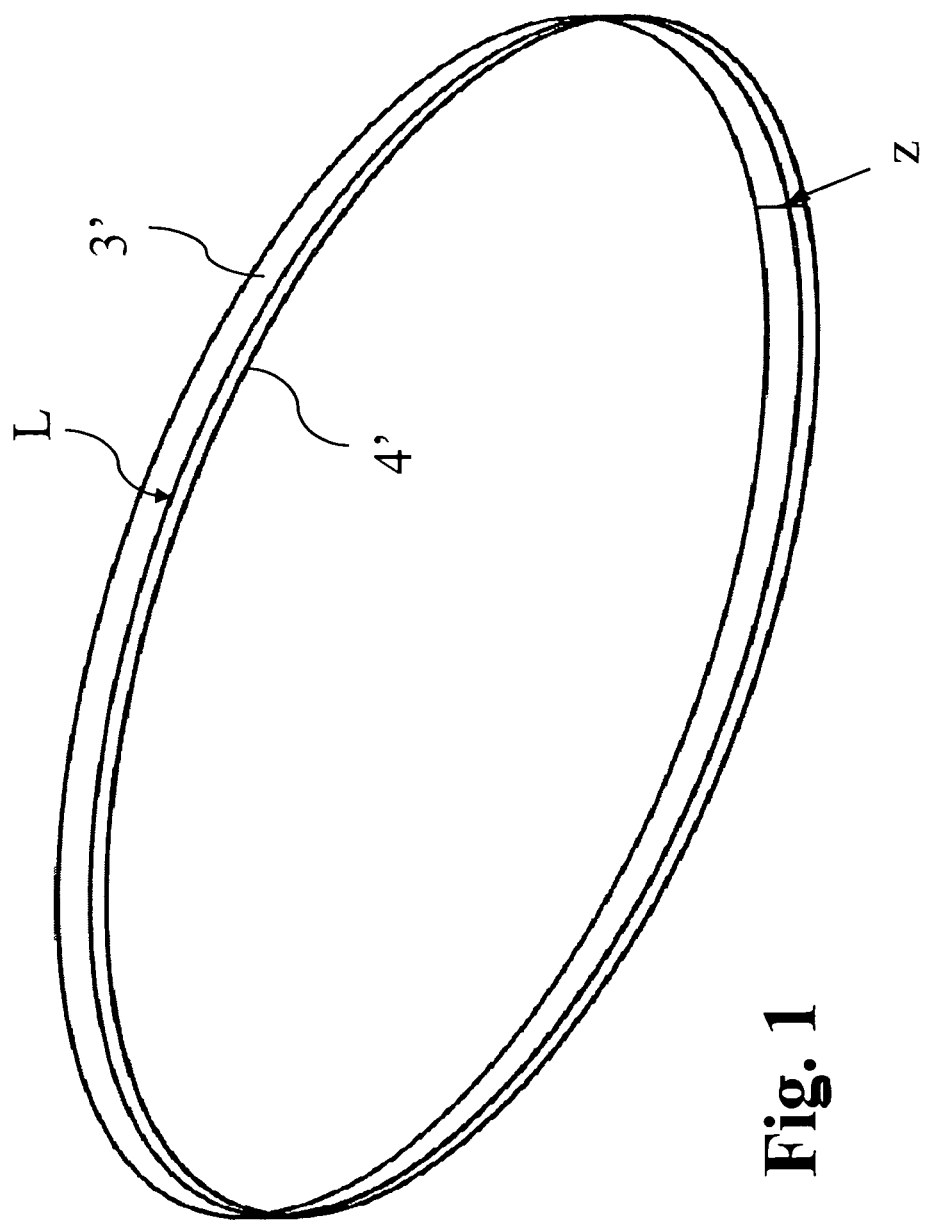
FIG. 1 schematically shows a first step of the manufacturing method according to the present invention.
Figure 2:
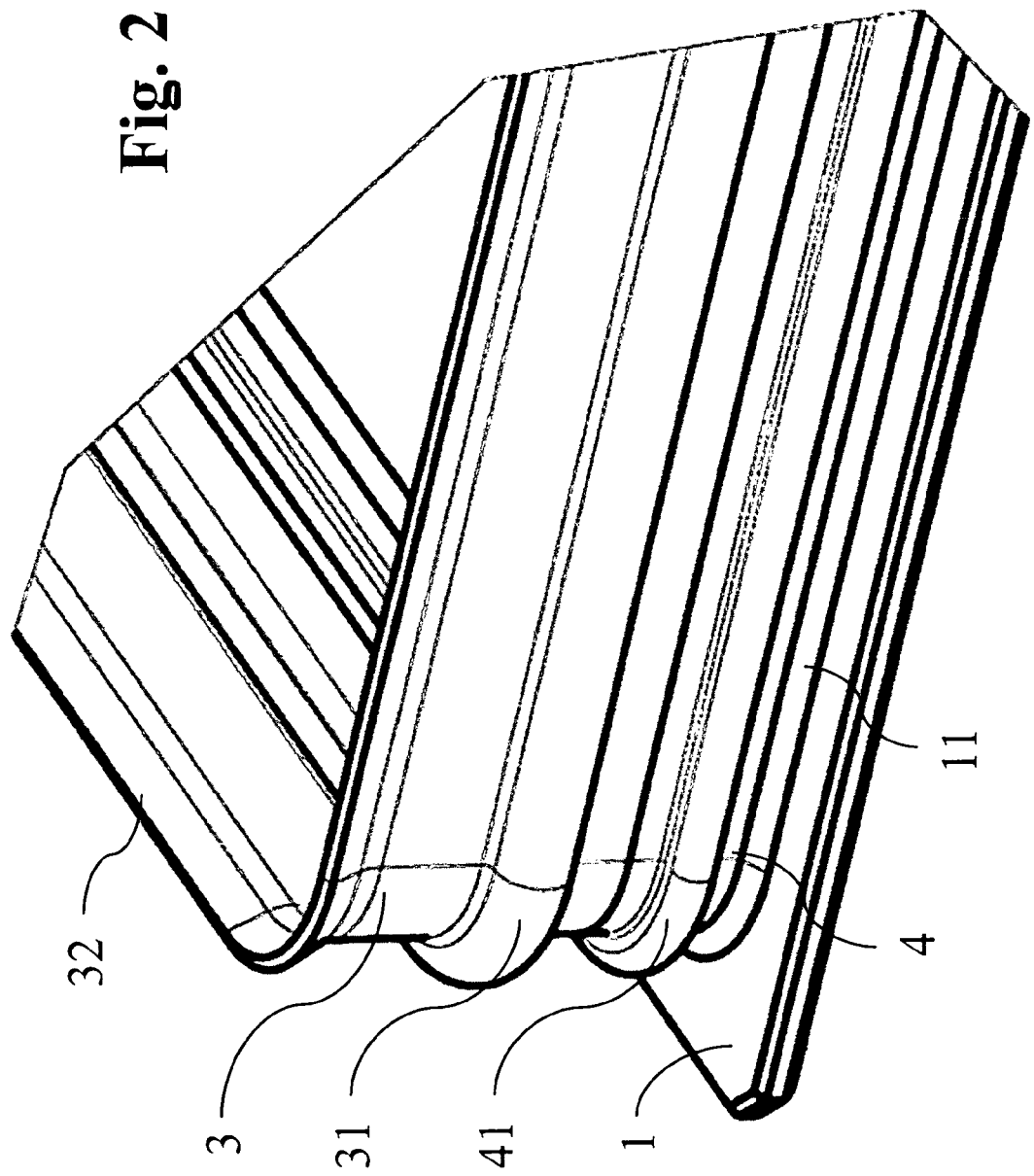
FIG. 2 schematically shows a perspective view of a detail of a vacuum solar thermal panel manufactured according to the method of the present invention.

A vacuum solar thermal panel according to the present invention comprises a substantially flat box-like vacuum-tight envelope defining a sealed volume and able to withstand atmospheric pressure when evacuated.

The vacuum-tight envelope comprise heat absorbing means, a pipe, a glass plate support structure and possibly other functional elements which do not pertain to the present invention, and therefore are not represented in the enclosed drawings.

The vacuum-tight envelope is defined by a front glass plate 1, substantially rectangular in shape, and a metal bottom plate 2 of roughly the same size parallel to it. Said two plates 1, 2 are kept in a spaced apart relationship by a peripheral frame 3 welded to the metal bottom plate 2, and by a peripheral belt 4 connecting the peripheral frame 3 to the glass front plate 1.

The peripheral frame 3 and belt 4 define a peripheral plane x preferably orthogonal with respect to the front glass plate 1.

The peripheral frame 3 has a thickness comprised between 0.5 and 5 mm, preferably 1.5 mm and exhibits a rigid behaviour, while the peripheral belt 4 is thinner (its thickness being comprised between 0.1 and 1 mm) and exhibits an elastic behaviour.

An upper edge 33 of the peripheral frame 3 pointing toward the front glass plate 1 is welded to a corresponding lower edge 43 of the peripheral belt 4 along a longitudinal seam L. As it may be seen in FIG. 4, the outer sides of the two peripheral elements are aligned, so that the outer surface of the vacuum-tight envelope is smooth at the longitudinal seam L. On the inside, the surface of the envelope features a step at the longitudinal seam L given the different thickness of the two peripheral elements.

The opposite edge of the peripheral frame 3, which will be named joining edge 32 in the following, is slightly inclined with respect to the previously defined peripheral plane x. In particular, the joining edge 32 is inclined outwards with respect to the interior of the vacuum-tight envelope, at an angle of about 30 degrees.

The joining edge 32 of the peripheral frame 3 is welded to a corresponding joining edge 22 of the metal bottom plate 2. In fact, the metal bottom plate 2 is flat, said peripheral joining edge 22 being inclined with respect to a main portion of the plate. The inclination of the joining edge 22 of the metal bottom plate 2 matches the inclination of the joining edge 32 of the peripheral frame 3, i.e. the joining edge 22 is inclined at an angle of about 60 degrees with respect to the main portion of the metal bottom plate 2. The term matching the inclination of the joining edge means that the angle formed by the plane identified by peripheral frame 3 and the one identified by the metal bottom plate 2 is approximately orthogonal. This explain why, at an angle of 30 degrees of the joining edge 32 corresponds a matching angle for the joining edge 22 of the metal bottom plate 2 of 60 degrees.

The peripheral frame 3 features a first longitudinal rib 31, semi-circular in cross-section, projecting toward the outside of the vacuum-tight envelope with respect to the peripheral plane x.

The peripheral belt features a second longitudinal rib 41, semi-circular in cross-section, projecting toward the outside of the vacuum-tight envelope with respect to the peripheral plane x.

The vacuum-tight envelope is manufactured according to a manufacturing step herein described.

Preliminarily, a first metal strip 3' and a second metal strip 4' are provided. The first metal strip 3' is taken from a thicker steel sheet with a thickness comprised between 0.5 and 5 mm, while the second strip 4' is taken from a thinner sheet (its thickness being comprised between 0.1 and 1 mm) of a controlled expansion alloy (preferably NiFe alloy 48) having substantially the same thermal expansion coefficient of the soda-lime glass employed for the glass front plate 1.

In a first step of the manufacturing method, the first metal strip 3' is in line welded edge to edge with the second metal strip 4' in order to form a pre-welded bi-metal strip, i.e. the upper edge 33 of the peripheral frame 3 is in line welded with the lower edge 43 of the peripheral belt 4. Preferably said operation is performed by arc welding at a speed of at least 0.5 m per minute or laser and electron-beam welding at a speed of 5 m per minute. Said welding step is preferably carried out taking care of aligning the outer surfaces (i.e. the surfaces that will eventually face the outside of the resulting vacuum-tight envelope) of the first and second metal strips 3', 4'.

The two opposite ends of the resulting bi-metal strip are then joined together and welded along a transverse seam z, in order to form a closed loop.

In a second step, the looped bi-metal strip is formed in the desired rectangular shape through known metal forming techniques. In such a step, the first metal strip 3' is shaped in the form of the peripheral frame 3 described above, while the second metal strip 4' takes the shape of the peripheral belt 4. In particular, the joining edge 32 of the peripheral frame 3 is bent into its final position and the first and second longitudinal ribs 31, 41 are obtained.

After the welding step, the resulting peripheral belt 4 is attached to the inner side of the glass front plate 1, at a short distance from the outer perimeter of the plate. In such a step, a vacuum-tight glass-metal seal 11 is obtained in a known manner. In particular, the vacuum-tight seal 11 is formed by local heating determining fusion and subsequent solidification of glass material; the fused glass material may be part of the glass front plate 1 itself or else a different frit material.

Meanwhile, the perimeter of a rectangular steel plate is bent through metal forming in order to obtain the metal bottom plate 2 with the inclined joining edge 22.

All other panel components like heat absorbing means, a pipe, a glass plate support structure and all other functional elements which do not pertain to the present invention are then attached to the metal bottom plate 2.

In a final step, the joining edges 22, 32 of the metal bottom plate 2 and of the peripheral frame 3 are pressed one against the other and welded in order to complete the structure of the vacuum-tight envelope.

Obviously, the afore-described finding may be subjected to numerous modifications and variants—by a man skilled in the art with the aim of meeting the possible and specific requirements—all falling within the scope of protection of the invention as defined by the following claims.

The invention claimed is:

1. A method for manufacturing a vacuum-tight envelope for a vacuum solar thermal panel, said vacuum-tight envelope being defined by a glass front plate transparent to solar radiation, a metal bottom plate, a peripheral frame joined to the metal bottom plate, and a peripheral belt connecting said peripheral frame to the glass front plate; said method comprising the following steps:

providing a first metal strip having a shape peripherally defined by: a first metal strip upper edge, a first metal strip lower edge opposed to said first metal strip upper edge, a first metal strip first end, a first metal strip second end opposed to said first metal strip first end;

providing a second metal strip having a shape peripherally defined by: a second metal strip upper edge, a second metal strip lower edge opposed to said second metal strip upper edge, a second metal strip first end, a second metal strip second end opposed to said second metal strip first end;

joining the first metal strip upper edge to the second metal strip lower edge in order to form a bi-metal strip, said first metal strip first end and said second metal strip first end thus defining a bi-metal strip first end, said first metal strip second end and said second metal strip second end thus defining a bi-metal strip second end opposed to said bi-metal strip first end;

joining together the bi-metal strip first end and the bi-metal strip second end with each other in order to form a closed loop;

after said joining steps, forming said first metal strip into the peripheral frame and said second metal strip into the peripheral belt;

after said joining and forming steps, sealing a free edge of the peripheral belt to the glass front plate;

after said joining and forming steps, joining the metal bottom plate to the peripheral frame.

2. The method according to claim 1, wherein the peripheral frame is more rigid than the peripheral belt.

3. The method according to claim 1, wherein the first metal strip is thicker than the second metal strip, sides of the first and second metal strips corresponding to an outer side of the resulting vacuum-tight envelope being aligned during the step of joining the first metal strip upper edge and the second metal strip lower edge.

4. The method according to claim 1, wherein the forming step comprises a step of shaping a first longitudinal rib in the peripheral frame.

5. The method according to claim 1, wherein the forming step comprises a step of shaping a second longitudinal rib in the peripheral belt.

6. The method according to claim 1, wherein the sealing step is performed by a thermal process determining fusion and subsequent solidification of glass material forming a vacuum-tight seal.

7. The method according to claim 1, wherein the first metal strip has a thermal expansion coefficient matching that of the glass front plate.

8. The method according to claim 7, wherein the first metal strip is made out of a controlled expansion alloy.

9. The method according to claim 1, wherein during the forming step a resulting free edge of the peripheral frame is inclined with respect to a peripheral plane, on which the peripheral belt and frame lie, in order to define a peripheral frame joining edge; the method comprising a step of forming the metal bottom plate, in order to determine a metal bottom plate joining edge inclined to match the inclination of the peripheral frame joining edge; the step of joining the metal bottom plate to the peripheral frame being performed after the sealing step and comprises joining the metal bottom plate joining edge to the peripheral frame joining edge.

10. The method according to claim 9, wherein said peripheral frame joining edge and said metal bottom plate joining edge are inclined outwards with respect to the resulting vacuum-tight envelope.

11. The method according to claim 10, wherein said peripheral frame joining edge and said metal bottom plate joining edge are inclined at an angle comprised between 5 degrees and 45 degrees with respect to the peripheral plane.

* * * * *